US012782099B2

(12) United States Patent
Leraas

(10) Patent No.: US 12,782,099 B2
(45) Date of Patent: Nov. 3, 2026

(54) MEASURING CALIPER AND MICROMETER STORAGE STAND

(71) Applicant: Michael Dean Leraas, Kernersville, NC (US)

(72) Inventor: Michael Dean Leraas, Kernersville, NC (US)

(73) Assignee: Michael Dean Leraas, Kernersville, NC (US)

( * ) Notice: Subject to any disclaimer, the term of this patent is extended or adjusted under 35 U.S.C. 154(b) by 351 days.

(21) Appl. No.: 18/610,554

(22) Filed: Mar. 20, 2024

(65) Prior Publication Data

US 2025/0297845 A1 Sep. 25, 2025

(51) Int. Cl.

| | |
|---|---|
| ***G01B 5/004*** | (2006.01) |
| ***G01B 5/00*** | (2006.01) |
| *G01B 3/18* | (2006.01) |
| *G01B 3/20* | (2006.01) |

(52) U.S. Cl.
CPC .............. *G01B 5/0004* (2013.01); *G01B 3/18* (2013.01); *G01B 3/20* (2013.01)

(58) Field of Classification Search
CPC ........... G01B 5/0004; G01B 3/18; G01B 3/38
USPC .......................................... 33/783, 813, 831
See application file for complete search history.

(56) References Cited

U.S. PATENT DOCUMENTS

| | | | | | |
|---|---|---|---|---|---|
| 1,737,764 | A * | 12/1929 | Jacobs | G01B 3/18 | 33/709 |
| 3,940,856 | A * | 3/1976 | Meyer, Jr. | G01B 3/38 | 33/501.05 |
| 4,420,890 | A * | 12/1983 | Naylor | G01B 3/18 | 269/319 |
| 4,731,931 | A * | 3/1988 | Goodman | G01B 3/20 | 33/520 |
| 4,821,422 | A * | 4/1989 | Porter | G01B 3/40 | 33/DIG. 1 |
| 5,383,286 | A * | 1/1995 | Kipnes | G01B 5/163 | 33/829 |
| 5,394,757 | A * | 3/1995 | Workman | G01B 5/012 | 73/866.5 |
| 6,263,585 | B1 * | 7/2001 | Dickinson | G01B 5/0004 | 33/783 |
| 6,334,594 | B1 * | 1/2002 | Bailey | F16M 11/2014 | 248/219.4 |
| 7,343,688 | B2 * | 3/2008 | Price | B43L 7/02 | 33/418 |

(Continued)

*Primary Examiner* — George B Bennett

(57) ABSTRACT

This invention holds caliper and micrometer measuring tools on a flat surface, to mount vertical or horizontal, including versions holding multiple calipers, versions holding micrometers in addition to calipers. The invention is needed for tool access, protecting tool when not in use, to: have tools on display for ornamentation, display tools with personalized placard on the tools holder. The holder features an enclosed slot for the caliper jaws and slotted perch for the beam with special 'leveling screw' allowing use for many models, designs, sizes, and makes. The Stand captures the caliper/micrometer so it cannot fall out and is protected from damaging its important features. Elevation adjustable soft set screw is employed under the beam end, allows for leveling in the holder. The tool holder can be made from variety of suitable materials. The tool can be mounted using embedded magnets or 2 sided tape to a variety of surfaces.

8 Claims, 4 Drawing Sheets

(56) References Cited

U.S. PATENT DOCUMENTS

| | | | | |
|---|---|---|---|---|
| 7,735,237 | B1 * | 6/2010 | Moon | G01B 3/20 33/783 |
| 8,245,413 | B2 * | 8/2012 | Hayashida | G01B 3/18 33/828 |
| 8,438,748 | B1 * | 5/2013 | Moon | G01B 5/0002 33/783 |
| 9,052,181 | B1 * | 6/2015 | DeLaGarza | G01B 3/205 |
| 9,778,011 | B1 * | 10/2017 | Armstrong | G01B 5/0004 |
| 10,866,126 | B2 * | 12/2020 | Iori | H01R 31/06 |
| 2025/0076021 | A1 * | 3/2025 | Yamaji | G01B 7/02 |

* cited by examiner

MEASURING CALIPER AND MICROMETER STORAGE STAND

BACKGROUND OF THE INVENTION

The Measuring Caliper Storage Stand is needed to: protect sensitive measuring calipers and the precision surfaces on said instruments. The stand in needed in office and shop environments to keep caliper in good shape, keep caliper accessible, keep electronic caliper screens visible for easy verification it is turned 'off' and not depleting the battery. Stand variations include, but are not limited to: single caliper, 2 calipers, 1 caliper and 1 micrometer, multiple micrometers, combinations of calipers and micrometers in other configurations.

SUMMARY OF THE INVENTION

Damaged measuring calipers and dead measuring caliper batteries led to design and manufacture of this unique and comprehensive solution. Also, not having to search for the measuring caliper (because it was in its Stand and very visible when in place) was an obvious additional benefit. Notably, this invention includes a 'leveling screw' on the 'fork end' of the part. This leveling screw is elevation adjustable to level the 'beam' of calipers when installed in the Stand. This is important to allow for many different styles, sizes, and makes of calipers all properly fitting in the Stand. Current design of the Stand fits 4", 6", and 12" calipers of all designs. Caliper Stands of this same design are designed in a CAD program to be used for 12" calipers also, and the design is adaptable to be scaled to other sizes as well. Micrometer Stand of same design and functionality for single/multiple micrometers of any size is related and included in the designs for this basic idea and invention.

BRIEF DESCRIPTION OF DRAWINGS

Drawings attached to the patent file include the following views.

DETAILED DESCRIPTION OF THE INVENTION

Figure 1:
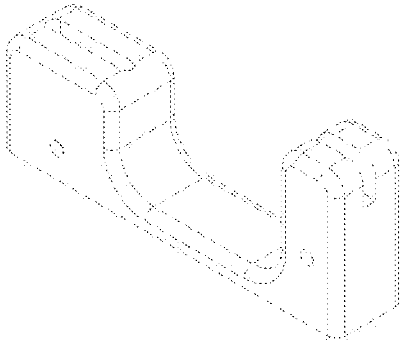
FIG. 1 is isometric of a single caliper stand holder.
Figure 2:
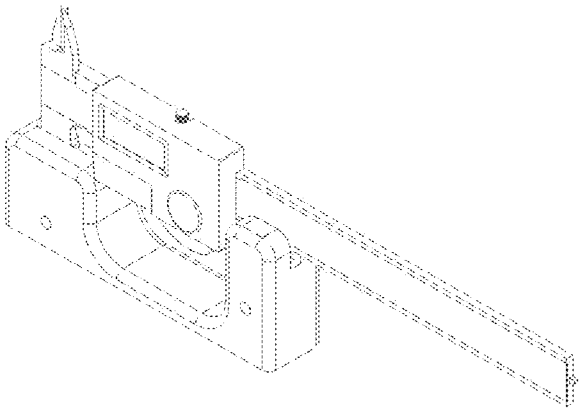
FIG. 2 is a caliper stand holder with representative caliper installed.
Figure 3:
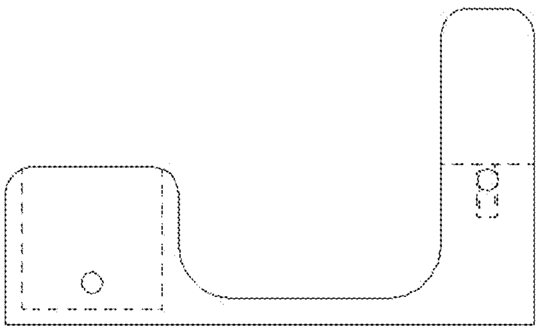
FIG. 3 is caliper stand holder with hidden lines showing internal features; threaded holes, slots.
Figure 4:
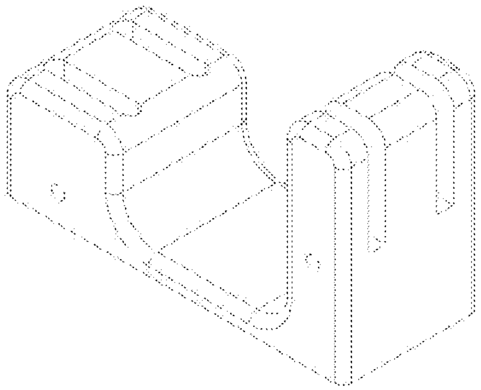
FIG. 4 is isometric of a two caliper stand holder.
Figure 5:
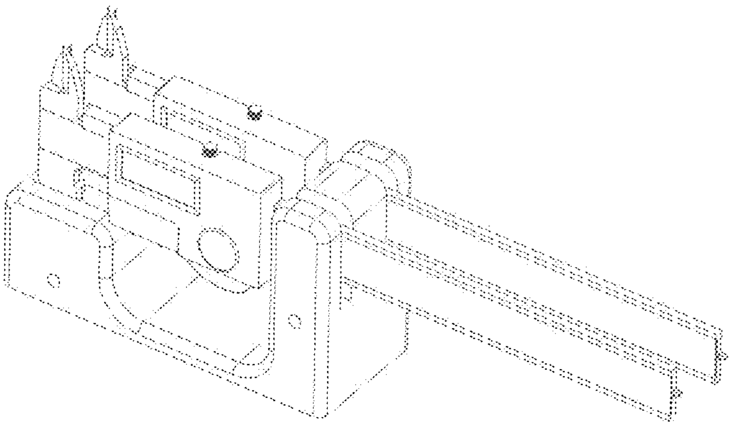
FIG. 5 is a two caliper stand holder with representative calipers installed.
Figure 6:
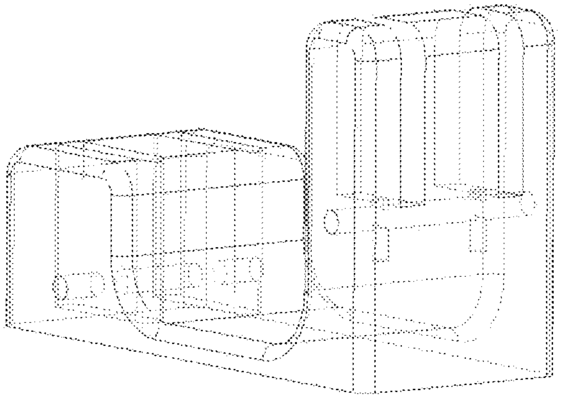
FIG. 6 is a two caliper stand with hidden lines showing internal features.
Figure 7:
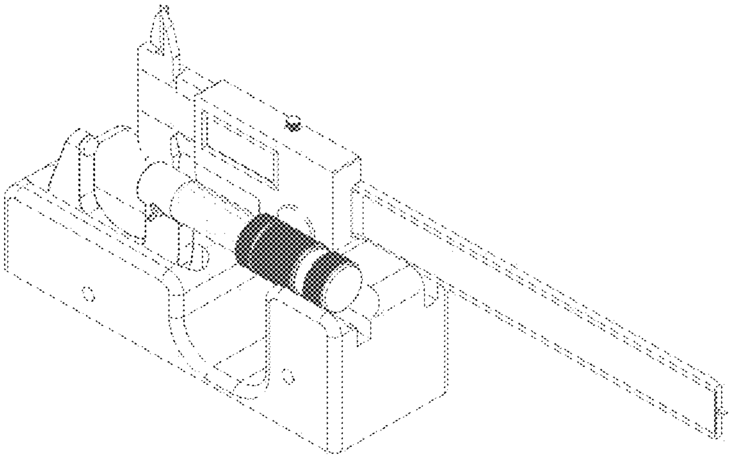
FIG. 7 is a micrometer AND caliper stand holder, with caliper installed.

The caliper stand/caliper-micrometer stand is needed to store these measuring instruments in a safe manner and have them available for quick access. This holder protects the critical surfaces of the measuring instruments during non-use. A main feature of the stand is that it can be mounted on vertical and horizontal surfaces with 2 sided tape. Magnets embedded in the stand will also mount it to steel horizontal and vertical surfaces. The ability to mount in this manner allows mounting in a machine shop environment to the top or side of surfaces congruent to machining operations. This keep the measuring tools available and protected during the business of machining operations. Various and many configurations of this invention are included; 1 caliper, multiple calipers, and combinations of calipers and 1" micrometers. 4", 6", 12" calipers fit in this pictured sized stand. Obviously, scaling the stand would accommodate larger calipers and micrometers if desired.

The invention claimed is:

1. A measuring caliper storage stand for supporting a measuring caliper having a beam portion, jaw portions, and a display, the measuring caliper storage stand comprising:

a unitary body formed from a non-marring material;

a base portion configured to support the unitary body on a supporting surface;

an enclosed jaw receiving pocket formed within the unitary body, the enclosed jaw receiving pocket defining a cavity configured to receive and protect the jaw portions of the measuring caliper;

a beam receiving slot formed in the unitary body opposite the enclosed jaw receiving pocket, the beam receiving slot being configured to receive the beam portion of the measuring caliper;

wherein the enclosed jaw receiving pocket and the beam receiving slot cooperate to support the measuring caliper in a generally upright stored position;

wherein the measuring caliper is retained within the measuring caliper storage stand by engagement between the measuring caliper and the enclosed jaw receiving pocket and the beam receiving slot without requiring a separate clamp, latch, spring, or movable retaining member; and wherein the unitary body positions the measuring caliper at a rearwardly inclined viewing angle such that a display of an electronic digital caliper remains visible while stored within the measuring caliper storage stand.

2. The measuring caliper storage stand of claim 1, wherein the unitary body further includes mounting surfaces configured to permit attachment to a horizontal surface or a vertical surface.

3. The measuring caliper storage stand of claim 1, further comprising an adjustable leveling member extending from the base portion and configured to adjust the orientation of the measuring caliper beam relative to the supporting surface.

4. The measuring caliper storage stand of claim 1, wherein the unitary body is produced from a polymer material to form a single integral structure.

5. The measuring caliper storage stand of claim 1, wherein the non-marring material comprises at least one of HDPE, UHMW polyethylene, ABS, nylon, or acetal.

6. The measuring caliper storage stand of claim 1, wherein the rearwardly inclined viewing angle is between approximately 3 degrees and 15 degrees from vertical.

7. The measuring caliper storage stand of claim 1, wherein the enclosed jaw receiving pocket includes an end wall positioned to prevent contact between the jaw portions and surrounding objects.

8. The measuring caliper storage stand of claim 1, wherein the enclosed jaw receiving pocket and the beam receiving slot cooperate to resist unintended removal of the measuring caliper from the measuring caliper storage stand.

* * * * *